United States Patent
Bosch et al.

(10) Patent No.: US 11,809,571 B2
(45) Date of Patent: Nov. 7, 2023

(54) VULNERABILITY ANALYSIS USING CONTINUOUS APPLICATION ATTESTATION

(71) Applicant: Cisco Technology, Inc., San Jose, CA (US)

(72) Inventors: Hendrikus G. P. Bosch, Aalsmeer (NL); Alessandro Duminuco, Milan (IT); Sape Jurriën Mullender, Amsterdam (NL)

(73) Assignee: CISCO TECHNOLOGY, INC., San Jose, CA (US)

( * ) Notice: Subject to any disclaimer, the term of this patent is extended or adjusted under 35 U.S.C. 154(b) by 213 days.

(21) Appl. No.: 17/346,898

(22) Filed: Jun. 14, 2021

(65) Prior Publication Data

US 2022/0398324 A1 Dec. 15, 2022

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC ............ G06F 21/577; G06F 2221/033; G06F 21/552; G06F 21/566; G06F 21/52
See application file for complete search history.

(56) References Cited

U.S. PATENT DOCUMENTS

| | | | | |
|---|---|---|---|---|
| 6,151,688 A * | 11/2000 | Wipfel | ................ | G06F 11/008 709/224 |
| 6,785,818 B1 * | 8/2004 | Sobel | ................ | G06F 21/552 726/22 |
| 7,933,950 B1 * | 4/2011 | Barton | ................ | H04N 21/47 709/227 |
| 9,230,129 B1 | 1/2016 | Mao et al. | | |
| 2005/0010804 A1 * | 1/2005 | Bruening | ................ | G06F 21/52 726/1 |
| 2006/0230390 A1 * | 10/2006 | Alexander, III | .... | G06F 11/3616 717/130 |
| 2007/0198841 A1 * | 8/2007 | Lundblade | ................ | G06F 8/61 713/176 |

(Continued)

OTHER PUBLICATIONS

PCT Search Report corresponding to PCT/US2022/072863, dated Sep. 19, 2022, 14 pages.

*Primary Examiner* — Meng Li
(74) *Attorney, Agent, or Firm* — Baker Botts L.L.P.

(57) ABSTRACT

The present disclosure is directed to systems and methods for vulnerability analysis using continuous application attestation, a method including receiving a load map associated with an application, the load map indicating loaded modules of the application; determining whether at least one notification is received indicating at least one update to the loaded modules of the application, wherein, if the at least one notification is received, the load map is updated based on the indicated at least one update, and wherein, if the at least one notification is not received, the load map is retained in an existing state; periodically retrieving call traces associated with the application, the call traces indicating executed modules of the application; and generating a continuous application attestation comprising at least a combination of the updated load map or the retained load map, and the retrieved call traces associated with the application at a given time.

20 Claims, 3 Drawing Sheets

(56) References Cited

U.S. PATENT DOCUMENTS

| | | | |
|---|---|---|---|
| 2007/0198974 A1* | 8/2007 | Branda | G06F 9/445 |
| | | | 717/166 |
| 2010/0333071 A1* | 12/2010 | Kuiper | G06F 11/3466 |
| | | | 717/130 |
| 2013/0290662 A1* | 10/2013 | Teal | G06F 21/52 |
| | | | 711/163 |
| 2015/0365436 A1 | 12/2015 | Shenefiel et al. | |
| 2017/0170966 A1* | 6/2017 | Sarangdhar | G06F 21/64 |
| 2018/0367507 A1 | 12/2018 | Statica et al. | |
| 2019/0165941 A1 | 5/2019 | Ray et al. | |
| 2019/0319980 A1 | 10/2019 | Levy et al. | |
| 2020/0021445 A1* | 1/2020 | Caceres | G06F 21/44 |
| 2020/0201620 A1 | 6/2020 | Beard | |
| 2020/0311268 A1* | 10/2020 | Kostyushko | G06F 21/561 |
| 2020/0342100 A1* | 10/2020 | Goldstein | G06F 21/52 |
| 2021/0081957 A1* | 3/2021 | Williams | G06F 21/57 |
| 2022/0398324 A1* | 12/2022 | Bosch | G06F 21/566 |

* cited by examiner

US 11,809,571 B2

VULNERABILITY ANALYSIS USING CONTINUOUS APPLICATION ATTESTATION

TECHNICAL FIELD

The present disclosure generally relates to vulnerability analysis of an application, and more specifically to systems and methods for vulnerability analysis of an application using continuous application attestation.

BACKGROUND

A software bill of material (SBOM) may be used to identify a set of vulnerabilities in a software package, a package composition, or a complete application. Vulnerabilities may allow for intrusions, theft of CPU, Distributed Denial-of-Service (DDoS) attacks, data snooping, infiltration or exfiltration of data, or other nefarious uses. Unfortunately, knowing the SBOM of an application alone may not be sufficient to understand whether an application has vulnerabilities or has already been breached. This is because an application may download code dynamically from third parties for integration into its base application, thereby changing the application from the SBOM. Alternatively, an application may have been subverted and its code dynamically updated, also falling outside the scope of the SBOM.

DESCRIPTION OF EXAMPLE EMBODIMENTS

Overview

Figure 1:
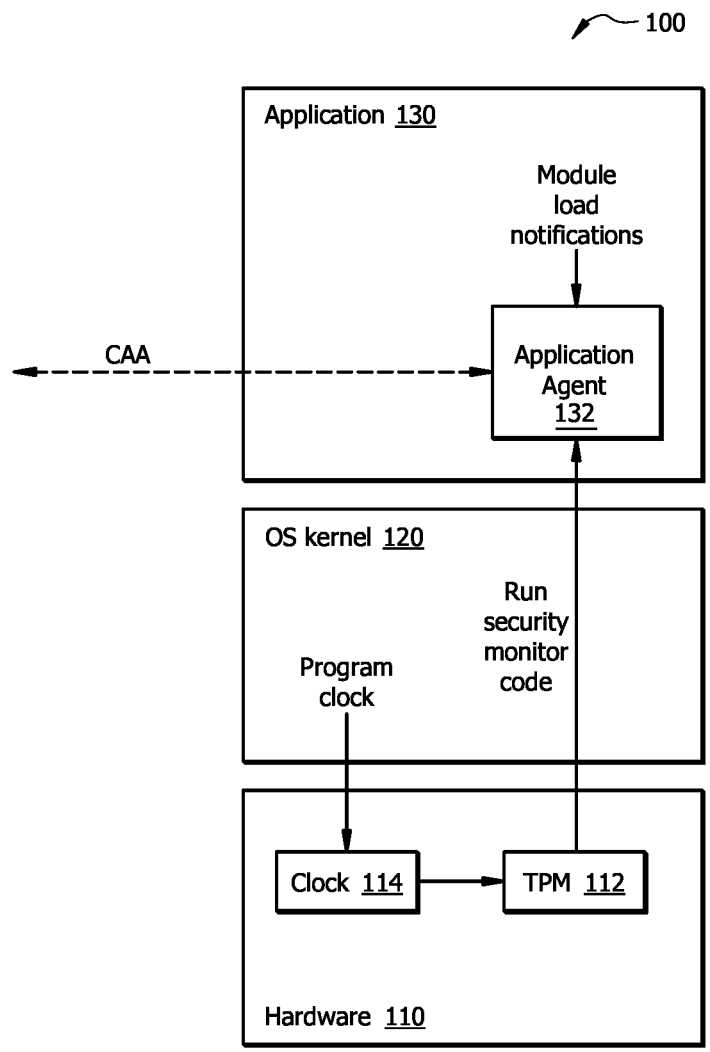
FIG. 1 illustrates a system for vulnerability analysis using continuous application attestation, in accordance with certain embodiments.

According to an embodiment, a system may include one or more processors and one or more computer-readable non-transitory storage media comprising instructions that, when executed by the one or more processors, cause one or more components of the system to perform operations including, receiving, at an application agent, a load map associated with an application, the load map indicating loaded modules of the application; determining whether at least one notification is received indicating at least one update to the loaded modules of the application, wherein, if the at least one notification is received, the load map is updated based on the indicated at least one update, and wherein, if the at least one notification is not received, the load map is retained in an existing state; periodically retrieving one or more call traces associated with the application, the one or more call traces indicating executed modules of the application; and generating a continuous application attestation comprising at least a combination of the updated load map or the retained load map, and the retrieved one or more call traces associated with the application at a given time.

Moreover, the application agent may be part of a trusted computing base (TCB) having a trusted platform module (TPM) for each host on which the application runs. Also, application agent may be logically associated with the application and may run in the TPM. The application agent may be verified by an agent certificate provisioned in the TPM, the agent certificate based on a hardware certificate of the TPM.

Additionally, the continuous application attestation may further comprise a time stamp for recordation and a private key signature based on the TPM.

Moreover, the at least one update may comprise one or more of the following: an addition of a new module to the application; or a removal of an existing module from the application.

Furthermore, the continuous application attestation may be operable to assess security of the application while the application is running.

According to another embodiment, a method may include the steps of receiving, at an application agent, a load map associated with an application, the load map indicating loaded modules of the application; determining whether at least one notification is received indicating at least one update to the loaded modules of the application, wherein, if the at least one notification is received, the load map is updated based on the indicated at least one update, and wherein, if the at least one notification is not received, the load map is retained in an existing state; periodically retrieving one or more call traces associated with the application, the one or more call traces indicating executed modules of the application; and generating a continuous application attestation comprising at least a combination of the updated load map or the retained load map, and the one or more call traces associated with the application at a given time.

According to yet another embodiment, one or more computer-readable non-transitory storage media may embody instructions that, when executed by a processor, cause the performance of operations, including receiving, at an application agent, a load map associated with an application, the load map indicating loaded modules of the application; determining whether at least one notification is received indicating at least one update to the loaded modules of the application, wherein, if the at least one notification is received, the load map is updated based on the indicated at least one update, and wherein, if the at least one notification is not received, the load map is retained in an existing state; periodically retrieving one or more call traces associated with the application, the one or more call traces indicating executed modules of the application; and generating a continuous application attestation comprising at least a combination of the updated load map or the retained load map, and the one or more call traces associated with the application at a given time.

Technical advantages of certain embodiments of this disclosure may include one or more of the following. The systems and methods described herein may allow for continuation application attestation for determining which modules (i.e., libraries, packages, components, and/or functions) have been loaded into and executed by the application. The continuation application attestation may be conducted at any time, including when the application is running, and may be run as part of a trusted platform module of a trusted computing base. As such, the continuation application attestation mechanism of the present disclosure may be used and analyzed by third parties to determine risks associated with the application.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Most security risks stem from hackers using known vulnerabilities in applications. Conventional security technology may track the open source libraries of the applications, allowing security personnel to address vulnerabilities before users of the applications are exposed to them. For example, when a SBOM is crafted for an application and combined with one or more security vulnerability databases, the security risks of the application may be known and countermeasures may be taken. However, simply tracking libraries and packages used by an application may not be sufficient in all cases. For example, if an application has been subverted or compromised, the application may no longer be running its intended software, but may instead be running hacked software. Thus, it is important to attest the software components of an application while the application is running. This may be difficult to accomplish when an application is hosted as a cloud service managed through a cloud service provider, as security personnel may have little control over the cloud service provider's infrastructure. Moreover, using application agents that run in the application to attest the application may be ineffective, as these agents may be subverted themselves.

The present disclosure is directed to vulnerability analysis using continuous application attestation (CAA). More specifically, the present disclosure is directed to provisioning an application agent responsible for library loading and software attestation to be run as part of a TPM. The application agent may be configured to produce a dynamic SBOM (referred to in the present disclosure as a dynamic load map) comprising a comprehensive and dynamic list of components or modules that have been loaded into the application, produce a set of call traces and/or provide for stochastic tracing of the application to determine the components or modules executed by the application, and to generate a CAA which includes the load map and the tracing information, signed with a TMP-managed certificate. The CAA may be a useful tool for client application security personnel to attest the server application is secure and not compromised. For example, in some implementations, a server application may share the CAA with trusted parties to enable a calling application to determine whether to proceed in calling that server application. The calling application may also cross-correlate the CAA with vulnerability databases.

FIG. 1 depicts a system 100 for vulnerability analysis of an application using continuous application attestation, in accordance with the present disclosure. FIG. 1 generally shows the architecture of the system 100 based on a single host and represented by a series of layers: a base layer comprising physical hardware 110; an intermediate layer comprising an operating system (OS) kernel 120; and an upper layer comprising a software application 130. Although FIG. 1 shows the software application 130 running from the physical hardware 110 and operating system kernel 120 associated with a single host, it is to be understood that the software application 130 may simultaneously run on a plurality of hosts and the mechanisms and operations of the present disclosure may be accordingly applied across the plurality of hosts.

The physical hardware 110 of the system 100 may include the one or more processors, one or more controllers, one or more memory modules, one or more system buses, and other components, as known in the art. Critical to the present disclosure, the physical hardware 110 may also include a trusted platform module (TPM) 112. The TPM 112 is a microcontroller that may be used to store platform measurements and information to ensure that the platform remains trustworthy. The TPM may be part of a trusted computing base (TCB), i.e., the set of all hardware, firmware, and/or software components that are critical to the security of the computer system. For example, the TCB may be based on Arm TrustZone® technology or Intel® Software Guard Extensions (SGX) functionality. By using a TPM that is part of a TCB, the security level may be enhanced since TCBs by design are difficult to subvert. The physical hardware 110 may also include a clock 114 and/or timer (not shown), which will be further described below.

Sitting atop the physical hardware 110 is the OS kernel 120. The OS kernel 120 may be responsible for, inter alia, memory management, process and task management, and disk management, and may act as a bridge between the software application 130 and the data processing performed at the physical hardware 110 level. The OS kernel 120 may also be responsible for gathering the register file for profiling applications. For purposes of the present disclosure, the OS kernel 120 may further be responsible to run the application agent 132 of the software application 130 and program the clock 114 in the physical hardware 110, as further described below.

Finally, at the top layer of the architecture is the software application 130. The software application 130 is a program or plurality of programs, typically designed for end users. In an embodiment, the software application 130 may comprise a server application to be used by third-party client applications. In an embodiment, the software application 130 may be hosted as a cloud service managed through a cloud service provider. The software application 130 may run one or more libraries, packages, components, and/or functions (hereafter individually or collectively referred to "modules") as part of its program(s). These modules may be externally sourced, or may rely on external server applications that incorporate and/or run code in the base software application 130. As a result, the software application 130 may be vulnerable to external threats or other security issues.

The software application 130 may include an application agent 132 comprising "security monitor" code. The application agent 132 may be logically part of the software application 130 itself, but may run its security monitor code in the TPM 112 of the host, e.g., by way of TrustZone® technology or Intel® SGX functionality. Since the software application 130 may run in conjunction with a plurality of hosts, the application agent 132 may run the security monitor code in a TPM associated with each of the plurality of hosts on which the software application runs. Moreover, since the application agent 132 is associated with a host TPM 112, the application agent 132 will be a trusted source for generating the CAA.

With respect to establishing trust in the application agent 132, the TPM 112 may be provisioned with a certificate issued by the underlying physical hardware 110 and signed by the manufacturer of the hardware. Thus, any statement uttered by the application agent 132 (through the security monitor code that runs in the TPM 112) may be verified through the hardware manufacturer's public key. When the application agent 132 is provisioned to run the security monitor code in the TPM 112, the TPM 112 may create a new certificate based on the hardware's certificate. The new certificate may include the hash of the application agent's 132 security monitor code and details associated with its software load. A private key associated with the application agent 132 may be kept securely in the TPM 112, and a public key of the application agent 132 may made available for verification and authentication purposes.

Therefore, using the TPM 112 as a root of trust, the TPM 112 may sign a certificate stating the secure fingerprint of the application running on the physical hardware 110. Furthermore, the TPM 112 may verify the public-key pair used by the application agent 132 and may include the public key in the certificate. In an embodiment, the application 130 may comprise an operating system and with the TPM's certificate as a basis, the operating system may sign further certificates attesting to the applications running on/in the operating system. In an embodiment, if the operating system is a hypervisor, then the hypervisor may attest to the images it runs in a virtual machine, and it may further verify the public-key pair used by the virtual machine to allow the virtual machine another level of attestation.

Once the foregoing trust mechanism is established, the application agent 132 may be responsible for maintaining a dynamic load map (a comprehensive list of modules that are dynamically loaded by the software application 130 at any given time), and producing a set of call traces generated by the OS kernel 120 and/or application traces initiated by the application agent 132 in conjunction with the software application 130. Together, these may be used to generate a CAA, as set forth below.

To begin, when the software application 130 is under development (e.g., during its development and/or staging phases), the software application 130 may load and integrate a plurality of modules (e.g., libraries, packages, components, and/or functions) for its use. Some of these modules may be derived from external sources. During development, the continuous integration/continuous development (CI/CD) pipeline may track the set of modules that have been loaded by the software application 130 and record them in an "initial" load map. The initial load map may include various information regarding the plurality of modules, including where each module is stored, where each module is executed from, where each module runs, how often each module is invoked, the hash associated with module, etc. The initial load map may also include information regarding the version of the software application 130 and information about vulnerabilities associated with the software application 130 (or a reference to a database entry that stores such information).

Once the software application 130 is deployed, the application agent 132 may derive the initial load map from the CI/CD pipeline and initialize it within the application agent 132. The load map may indicate modules that have been loaded by the application (referred to as "loaded modules" of the application). The plurality of modules that is loaded by the software application 130 may continue to be updated over time, i.e., the software application 130 may load new modules and/or remove existing modules, as required for particular implementations. The software application 130 may notify the application agent 132 each time an update is made to the plurality of loaded applications, i.e., each time a new module is loaded to the software application 130 and/or each time an existing module is removed from the software application 130. The application agent 132 may then update the load map accordingly. Specifically, when an update is made to the plurality of loaded modules and relates to the loading of a new module, the load map may be updated to include, e.g., an image associated with the newly loaded module, information indicating the origination of the new module (where the new module was loaded from), and information indicating the destination of the new module (the location in memory where the new module is loaded to). When an update is made to the plurality of loaded modules and relates to the removal of an existing module, the load map may be updated to indicate that the associated entry in the load map and/or related database is invalid. In an embodiment, the information relating to the removed module may still be maintained by the application agent 132. In instances where no updates are made to the plurality of loaded modules (i.e., no notifications are received by the application agent 132 from the software application 130 that an update has been made to the plurality of loaded modules), the load map is simply retained in its existing state. In other words, the load map is not updated. The "existing state" may refer to the current state of the load map. In an embodiment, the existing state may refer to the state or version of the load map that was received from the CI/CD chain. In another embodiment, the existing state may refer to the state or version of the load map after the last update cycle that was used for the last CAA generation (if any). In this manner, the application agent 132 may dynamically track and record the plurality of modules that are loaded in the software application 130 at any given time, resulting in a dynamic load map.

Additionally, the application agent 132 may track the modules that are executed by the software application 130 (i.e., "executed modules" of the application) at any given time by retrieving call traces. The mechanism for retrieving call traces may depend on the programming language in which the software application 130 is based. Thus, the application agent 132 may first determine whether the software application 130 is based on a compiled programming language or an interpreted/scripted programming language. If it is determined that the software application 130 is based on a compiled program (e.g., C, C++, etc.), the application agent 132 may interact with the OS kernel 120 to periodically retrieve call traces. Specifically, the OS kernel 120 may program the clock 114 in the physical hardware 110 to be triggered at prescribed intervals. The clock 114 may also be programmed to trigger at random intervals, which may make it more difficult for nefarious actors to subvert the described attestation mechanism. The OS kernel 120 may be configured to obtain call traces by recording the program counter of the software application 130 at either the prescribed or the random intervals. In an embodiment, the OS kernel 120 may further be configured to record the whole register file. In this manner, the OS kernel 120 may obtain call traces, i.e., the record of instructions executed, at prescribed or random intervals. The application agent 132 may then periodically retrieve these call traces from the OS kernel 120, the call traces indicating the modules executed by the application at specified times. The frequency at which the application agent 132 retrieves the call traces may be pre-configured. In an embodiment, a plurality of call traces may be combined to generate a call graph.

If it is determined that the software application 130 is based on an interpreted/scripted program (e.g., Python, TCL, JavaScript, etc.), where the "code" is kept in the application's data segment or block starting symbol (BSS) segment and not executable per se, the application agent 132 may retrieve call traces using an application tracing function. The application tracing function is capable of parsing the scripted program that is stored in the data or BSS segment and adding tracing checkpoints. The application agent's 132 language-specific handler may then generate a trace of the scripted application. Specifically, the clock 114 may be programmed to trigger at prescribed or random intervals through the OS kernel 120. In an embodiment, to preclude nefarious actors from anticipating when application tracing samples are created, the measurement points may be distributed stochastically. At each clock interval, the application agent 132 may then trace the software application 130, wherein, for example, the program counter may be paused for tracing after each progression to the next line of code. For purposes of the present disclosure, the traces retrieved for compiled programs, as well as those derived from application tracing for scripted programs, may both generally be referred to as "call traces."

Next, the application agent 132 may then generate a CAA at any point in time, each CAA comprising at least the updated load map (updated as of the time the given CAA is generated) and the call traces. The application agent 132 may also add to the CAA a time stamp for recordation purposes and a private key signature of the application agent 132 derived from the TPM 112 and its hardware key for authentication purposes. Thus, the CAA provides information from which to understand what modules (and associated functions) have been executed by the software application 130, what modules have been loaded that are and/or are not associated with those functions, the hash of the functions, and the source of the modules.

The CAA may be a valuable asset for security personnel, providing essentially an audit trail for assessing and/or verifying that an application is secure and operating correctly, that the application is running the appropriate modules that correspond to the loaded modules, and that the modules are not subject to vulnerability attacks. As such, the CAA may, in some instances, be created upon request by a remote supervising entity. Also, since the CAA comprises sensitive information, access may be precluded to unauthorized entities and/or encryption mechanisms may be utilized when transmitting the CAA. Further, to ensure that only the appropriate users may access a CAA, the application agent 132 may be configured with an Access Control List (ACL) that indicates, by way of the public key, which parties may access the CAA. There are various mechanisms to accomplish this, including requiring a client of an application agent to prove its identity with its private key. Other mechanisms may be utilized, as known in the art.

Once generated, a CAA may allow for detailed analysis of the application and may be used in various security applications. For instance, modules that are used by the application may be correlated with the National Vulnerabilities Database (NVD) and specific vulnerabilities may be analyzed. Moreover, since the tracing function allows for precise program counters of compiled programs and/or file-and-line-numbers of scripted programs to be known, specific functions of the known vulnerabilities may be identified. For example, if an application executes code that has not been validated or executes functions without known corresponding code, misuse of buffer overflow issues may be identified. Likewise, if a CAA lists an unknown process in conjunction with an application, hacking of the application may be identified.

The CAA may also be used to create a security risk score. Trusted third-party services may obtain a server application's CAA and then create a security score based on the CAA. This third-party service may be used to assess the server application and determine if the server has been compromised, and by configuration, generate a security risk score that may be used by a client application to determine the risk of exposure when using the server. This may be done on every remote procedure call to the server, if so desired. When the client is at risk, by policy, the client application may also decline to make the call to the server altogether, quarantine the call, raise alerts that notify security personnel, or apply RASP functions to protect itself. In case vulnerabilities are detected in the server application, the client or the service's security personnel may retroactively determine whether the client was exposed during operation.

Figure 2:
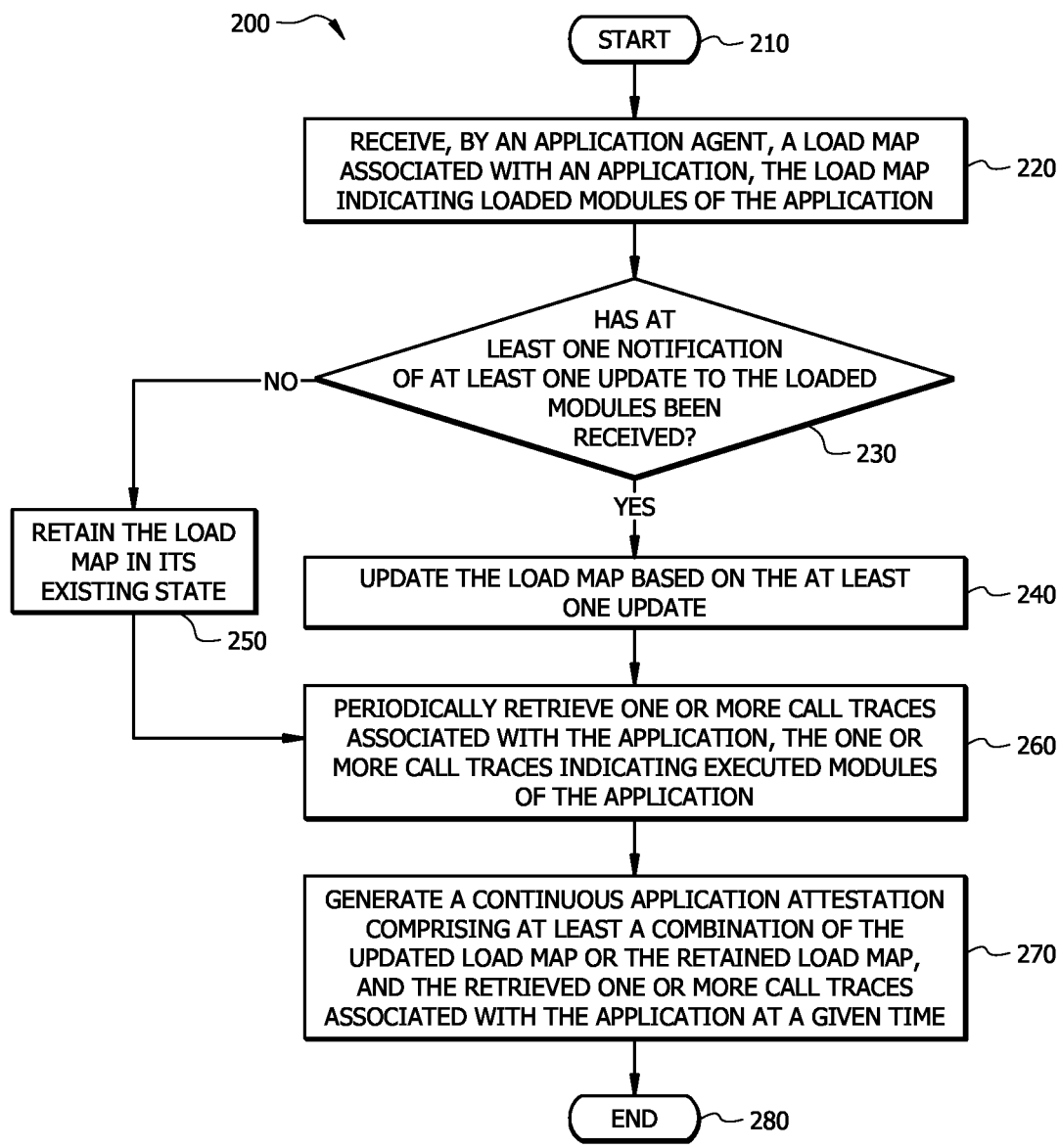
FIG. 2 illustrates a flow diagram of a method for vulnerability analysis using continuous application attestation, in accordance with certain embodiments.

Reference is now made to FIG. 2, wherein is shown a flow diagram of a method 200 for vulnerability analysis using continuous application attestation, in accordance with the present disclosure. The steps of the method 200 may be in accord with the operations outlined in conjunction with the system 100 of FIG. 1. As such, similar and corresponding terms described in conjunction with FIG. 1 may have the same meaning when used in conjunction with the method 200 of FIG. 2. Additionally, the present disclosure incorporates by reference the description of FIG. 1 for the purposes of explaining, expounding upon, or otherwise clarifying the steps of the method 200.

The method 200 may be performed in any environment suitable for hosting and/or running web or cloud-based applications. The method 200 may involve a software application. In an embodiment, the software application may comprise a server application to be used by third-party client applications. In an embodiment, the software application may be hosted as a cloud service managed through a cloud service provider. The software application may comprise a program or plurality of programs. The software application may run one or more libraries, packages, components, and/or functions (individually or collectively referred to "modules") as part of its program(s). These modules may be externally sourced, or may rely on external server applications that incorporate and/or run code in the base software application. As a result, the software application may be vulnerable to external threats or other security issues.

The software application may be running on a host comprising a physical hardware and an operating system (OS) kernel. Although method 200 may be described in conjunction with a software application running on a single host, it is to be understood that the software application may simultaneously run on a plurality of hosts and the steps of the method 200 may be applied accordingly across the plurality of hosts. The physical hardware may comprise one or more processors, one or more controllers, one or more memory modules, one or more system buses, and other components, as known in the art. The physical hardware may also include a trusted platform module (TPM), e.g., a microcontroller that may be used to ensure that the platform remains trustworthy. The TPM may be part of a trusted computing base (TCB), i.e., the set of all hardware, firmware, and/or software components that are critical to the security of the computer system. The TCB may be based on Arm TrustZone® technology or Intel® SGX functionality. The physical hardware may also include a clock and/or timer.

The OS kernel may be responsible for memory management, process and task management, and disk management, and may act as a bridge between the software application and the data processing performed at the physical hardware. The OS kernel may also be responsible for gathering the register file for profiling the software application. For purposes of the present disclosure, the OS kernel may further be responsible to program the clock in the physical hardware.

The software application may include an application agent comprising "security monitor" code. The application agent may be logically part of the software application itself, but may run its security monitor code in the TPM of the host, e.g., by way of TrustZone® or Intel® SGX functionality.

Since the software application may run in conjunction with a plurality of hosts, the application agent may run the security monitor code in a TPM associated with each of the plurality of hosts. Moreover, since the application agent is associated with a host TPM, the application agent will be a trusted source for generating the CAA. The OS kernel may be responsible to run the application agent of the software application in the TPM.

The method 200 presumes that trust has been established with respect to the application agent. Specifically, the TPM may be provisioned with a certificate issued by the underlying physical hardware and signed by the manufacturer of the hardware. Thus, any statement uttered by the application agent (through the security monitor code that runs in the TPM) may be verified through the hardware manufacturer's public key. When the application agent is provisioned to run the security monitor code in the TPM, the TPM may create a new certificate based on the hardware's certificate. The new certificate may include the hash of the application agent's security monitor code and details associated with its software load. A private key associated with the application agent may be kept securely in the TPM, and a public key of the application agent may made available for verification and authentication purposes. Using the TPM as a root of trust, the TPM may sign a certificate stating the secure fingerprint of the application running on the physical hardware. Furthermore, the TPM may verify the public-key pair used by the application agent and may include the public key in the certificate. In an embodiment, the application may comprise an operating system and with the TPM's certificate as a basis, the operating system may sign further certificates attesting to the applications running on/in the operating system. In an embodiment, if the operating system is a hypervisor, then the hypervisor may attest to the images it runs in a virtual machine, and it may further verify the public-key pair used by the virtual machine to allow the virtual machine another level of attestation.

The steps of method 200 may be performed from the perspective of the application agent embedded in the software application. However, it is to be understood that method 200 may be performed by any component, element, or module associated with virtualized environment without departing from the spirit or scope of the present disclosure.

Method 200 may begin at step 210. At step 220, the application agent may receive, from a CI/CD pipeline, a load map associated with an application, the load map indicating modules that have been loaded by the application (referred to as "loaded modules" of the application). Specifically, when the software application is under development, the software application may load and integrate a plurality of modules (e.g., libraries, packages, components, and/or functions) for its use. Some of these modules may be derived from external sources. The CI/CD pipeline may track the plurality of modules that have been loaded by the software application and record them in an initial load map. When the software application is deployed, the application agent may derive this initial load map from the CI/CD pipeline and initialize it within the application agent.

The plurality of modules that is loaded by the software application may continue to be updated over time, i.e., the software application may load new modules and/or remove existing modules, as required for particular implementations. The software application may notify the application agent each time an update is made to the plurality of loaded applications, i.e., each time a new module is loaded to the application and each time an existing module is removed from the application.

At step 230, the application agent may determine whether at least one notification has been received indicating at least one update to the plurality of loaded modules. If, at step 230, it is determined that a notification has been received indicating at least one update to the plurality of loaded modules, the method may proceed to step 240. At step 240, the application agent may update the load map based on the indicated at least one update. Specifically, when an update is made to the plurality of loaded applications and relates to the loading of a new module, the load map may be updated to include, e.g., the image associated with the newly loaded module, information indicating where the new module was loaded from, and information indicating the location in memory the new module is loaded to. When an update is made to the plurality of loaded application and relates to the removal of an existing module, the load map may be updated to indicate that associated entry in the load map and/or related database is invalid. In this manner, the application agent may dynamically track and record the set of modules that are loaded to (or unloaded from) the software application at any given time.

If, however, at step 230, it is determined that a notification has not been received indicating at least one update to the plurality of loaded modules, the method may proceed to step 250. At step 250, the application agent may retain the load map in its existing state. In other words, in instances where no updates are made to the plurality of loaded modules (i.e., no notifications are received from the software application that an update has been made to the plurality of loaded modules, including since the last time a CAA was generated, if any), the load map is simply retained in its current state, i.e., not updated. The "existing state" may refer to the current state of the load map. In an embodiment, the existing state may refer to the state or version of the load map that was received from the CI/CD chain. In another embodiment, the existing state may refer to the state or version of the load map after the last update cycle that was used for the last CAA generation (if any).

From step 240 or step 250, the method may proceed to step 260. At step 260, the application agent may periodically retrieve one or more call traces associated with the application, the one or more call traces providing information on modules that have been executed by the application (referred to as "executed modules" of the application). The mechanism for retrieving call traces may depend on the programming language in which the software application is based. Thus, the application agent may first determine whether the application is based on a compiled programming language or an interpreted/scripted programming language. If it is determined that the application is based on a compiled program (e.g., C, C++, etc.), the application agent may interact with the OS kernel to retrieve call traces. Specifically, the OS kernel may program the clock in the physical hardware to be triggered at prescribed or randomized intervals. The OS kernel may be configured to obtain call traces by recording the program counter of the application at either the prescribed or random intervals. In an embodiment, the OS kernel may further be configured to record the whole register file. In this manner, the OS kernel may obtain call traces, i.e. the record of instructions executed, at prescribed or random intervals). The application agent may then periodically retrieve these call traces from the OS kernel, the call traces indicating the modules executed by the application at the specified times. The frequency at which the application agent retrieves the call traces may be pre-configured. In an embodiment, a plurality of call traces may be combined to generate a call graph.

For applications that comprise interpreted/scripted programs (e.g., Python, TCL, JavaScript, etc.), where the "code" is kept in the application's data or BSS segment and not executable per se, the application agent may retrieve call traces using an application tracing function. The application tracing function is capable of parsing the scripted program that is stored in the data or BSS segment and adding tracing checkpoints. The application agent's language-specific handler may then generate a trace of the scripted application. Specifically, at each clock interval, the application agent may trace the application whereby the program counter may be paused for tracing, for example, after each progression to the next line of code. To preclude nefarious actors from anticipating when application tracing samples are created, the measurement points may be distributed stochastically. For example, the clock may be programmed to go off at random intervals through the OS kernel.

At step 270, the application agent may generate a continuous application attestation (CAA) that indicates one or more modules executed by the application at a given time, the continuous application attestation comprising at least a combination of: 1) either the updated load map (i.e., the load map updated based on updates to the plurality of loaded applications) or the retained load map (i.e., the load map retained in its existing state because, e.g., no updates have been made to the plurality of loaded applications since the last CAA generation, if any); and 2) the one or more call traces. A CAA may be generated at any point in time or number of times. The application agent may also add to the CAA a time stamp for recordation purposes and a private key signature of the application agent, which is derived from the TPM and its hardware key. Thus, the CAA provides information from which to understand what modules (and associated functions) have been executed by the application, what modules have been loaded that are and/or are not associated with those functions, the hash of the functions, and the source of the modules. As described above, the CAA may be utilized in various use cases and is operable to assess security and operation of the application while the application is running.

At step 280, the method may end.

Figure 3:
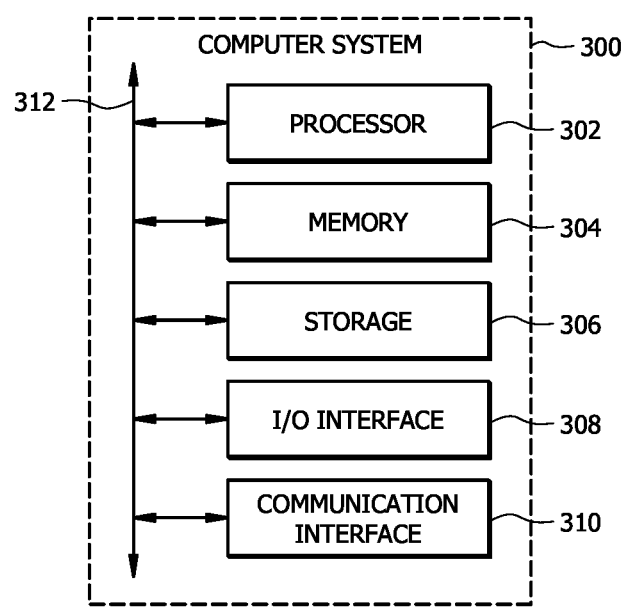
FIG. 3 illustrates a computer system, in accordance with certain embodiments.

Reference is now made to FIG. 3, wherein is shown an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
    one or more processors;
    one or more computer-readable non-transitory storage media comprising instructions that, when executed by the one or more processors, cause one or more components of the system to perform operations comprising:
        receiving, at an application agent, a load map associated with an application, the load map indicating loaded modules of the application, the load map being a dynamic software bill of material (SBOM);
        determining whether at least one notification is received indicating at least one update to the loaded modules of the application,
            wherein, when the at least one notification is received, the load map is updated based on the indicated at least one update, and
            wherein, when the at least one notification is not received, the load map is retained in an existing state;
        periodically retrieving one or more call traces associated with the application, the one or more call traces indicating executed modules of the application; and
        generating a continuous application attestation comprising at least a combination of the updated load map or the retained load map, and the retrieved one or more call traces associated with the application at a given time.

2. The system of claim 1, wherein the application agent is part of a trusted computing base (TCB) having a trusted platform module (TPM) for each host on which the application runs.

3. The system of claim 2, wherein the application agent is logically associated with the application and runs in the TPM.

4. The system of claim 3, wherein the application agent is verified by an agent certificate provisioned in the TPM, the agent certificate based on a hardware certificate of the TPM.

5. The system of claim 3, wherein the continuous application attestation further comprises:
    a time stamp for recordation; and
    a private key signature based on the TPM.

6. The system of claim 1, wherein the at least one update comprises one or more of the following:
    an addition of a new module to the application; or
    a removal of an existing module from the application.

7. The system of claim 1, wherein the continuous application attestation is operable to assess security of the application while the application is running.

8. A method, comprising:
    receiving, at an application agent, a load map associated with an application, the load map indicating loaded modules of the application, the load map being a dynamic software bill of material (SBOM);
    determining whether at least one notification is received indicating at least one update to the loaded modules of the application,
        wherein, when the at least one notification is received, the load map is updated based on the indicated at least one update, and
        wherein, when the at least one notification is not received, the load map is retained in an existing state;

periodically retrieving one or more call traces associated with the application, the one or more call traces indicating executed modules of the application; and generating a continuous application attestation comprising at least a combination of the updated load map or the retained load map, and the retrieved one or more call traces associated with the application at a given time.

9. The method of claim 8, wherein the application agent is part of a trusted computing base (TCB) having a trusted platform module (TPM) for each host on which the application runs.

10. The method of claim 9, wherein the application agent is logically associated with the application and runs in the TPM.

11. The method of claim 10, wherein the application agent is verified by an agent certificate provisioned in the TPM, the agent certificate based on a hardware certificate of the TPM.

12. The method of claim 10, wherein the continuous application attestation further comprises:
a time stamp for recordation; and
a private key signature based on the TPM.

13. The method of claim 8, wherein the at least one update comprises one or more of the following:
an addition of a new module to the application; or
a removal of an existing module from the application.

14. The method of claim 8, wherein the continuous application attestation is operable to assess security of the application while the application is running.

15. One or more computer-readable non-transitory storage media embodying instructions that, when executed by a processor, cause performance of operations comprising:
receiving, at an application agent, a load map associated with an application, the load map indicating loaded modules of the application, the load map being a dynamic software bill of material (SBOM);
determining whether at least one notification is received indicating at least one update to the loaded modules of the application,
wherein, when the at least one notification is received, the load map is updated based on the indicated at least one update, and
wherein, when the at least one notification is not received, the load map is retained in an existing state;
periodically retrieving one or more call traces associated with the application, the one or more call traces indicating executed modules of the application; and
generating a continuous application attestation comprising at least a combination of the updated load map or the retained load map, and the retrieved one or more call traces associated with the application at a given time.

16. The one or more computer-readable non-transitory storage media of claim 15, wherein the application agent is part of a trusted computing base (TCB) having a trusted platform module (TPM) for each host on which the application runs.

17. The one or more computer-readable non-transitory storage media of claim 16, wherein the application agent is logically associated with the application and runs in the TPM.

18. The one or more computer-readable non-transitory storage media of claim 17, wherein the application agent is verified by an agent certificate provisioned in the TPM, the agent certificate based on a hardware certificate of the TPM.

19. The one or more computer-readable non-transitory storage media of claim 17, wherein the continuous application attestation further comprises:
a time stamp for recordation; and
a private key signature based on the TPM.

20. The one or more computer-readable non-transitory storage media of claim 15, wherein the at least one update comprises one or more of the following:
an addition of a new module to the application; or
a removal of an existing module from the application.

* * * * *